United States Patent [19]

Terano et al.

[11] Patent Number: 4,460,701

[45] Date of Patent: Jul. 17, 1984

[54] PROCESS FOR THE PREPARATION OF CATALYST COMPONENT FOR THE POLYMERIZATION OF OLEFINS

[75] Inventors: Minoru Terano, Chigasaki; Kouhei Kimura, Kanagawa; Atsushi Murai, Chigasaki; Masuo Inoue, Chigasaki; Katsuyoshi Miyoshi, Chigasaki, all of Japan

[73] Assignee: Toho Titanium Co., Ltd., Tokyo, Japan

[21] Appl. No.: 482,059

[22] Filed: Apr. 5, 1983

[30] Foreign Application Priority Data

Nov. 17, 1982 [JP] Japan ................. 57-200454

[51] Int. Cl.$^3$ .......................... C08F 4/02; C08F 4/64
[52] U.S. Cl. .................... 502/104; 502/107; 502/128; 502/133; 502/127; 526/124; 526/125
[58] Field of Search ............... 502/104, 107, 127, 128, 502/133

[56] References Cited

U.S. PATENT DOCUMENTS

| | | | |
|---|---|---|---|
| 3,644,318 | 2/1972 | Diedrich et al. | 502/133 X |
| 3,840,470 | 10/1974 | Ligorati et al. | 502/107 |
| 4,144,390 | 3/1979 | Derroitte et al. | 502/133 X |
| 4,311,612 | 1/1982 | Boone et al. | 502/128 X |

*Primary Examiner*—Patrick Garvin
*Attorney, Agent, or Firm*—Fisher, Christen & Sabol

[57] ABSTRACT

A process for the preparation of the former catalyst component of a catalyst for the polymerization of olefins composed of a titanium-based catalyst component and an organo aluminium compound is disclosed, which process comprises suspending (a) a fatty acid salt of magnesium and (b) dialkoxymagnesium into (c) a liquid halogenated hydrocarbon to form a first suspension, and adding said first suspension to (d) a titanium halide of the general formula: $TiX_4$, wherein X represents a halogen atom, to be contacted for reaction to form a first reaction mixture, (e) an electron donor compound being present in at least one of the first suspension, the titanium halide and the first reaction mixture; or suspending the dialkoxymagnesium into the liquid halogenated hydrocarbon to form a second suspension, and adding said second suspension to a mixture of the titanium halide and the fatty acid salt of magnesium to be contacted for reaction to form a second reaction mixture, the electron donor compound being present in at least one of the second suspension, the mixture of the titanium halide and the fatty acid salt of magnesium, and the second reaction mixture.

In the polymerization of olefins by use of the former catalyst component, both the amount of catalyst residues in the produced polymer and halogen content therein are greatly reduced with high polymerization activity per unit weight of the former catalyst component and with high yield of stereoregular polymer.

15 Claims, No Drawings

PROCESS FOR THE PREPARATION OF CATALYST COMPONENT FOR THE POLYMERIZATION OF OLEFINS

BACKGROUND OF THE INVENTION

1. Field of the Invention

This invention relates to a process for the preparation of a titanium-based catalyst component (hereinafter referred to simply as a catalyst component) of a catalyst for use in the polymerization of olefins composed of the titanium-based catalyst component and an organo aluminum compound, where polymerization includes homopolymerization and copolymerization thereof.

That is, this invention relates to a process for the preparation of a catalyst component having such a high activity that when applied to the polymerization of olefins it serves to show a high activity, and stereoregular polymer can be obtained in high yield, and more particularly relates to a process for the preparation of a catalyst component, which comprises contacting a fatty acid salt of magnesium, dialkoxymagnesium, an electron donor compound and a titanium halide of the general formula: $TiX_4$, wherein X represents a halogen atom.

2. Description of the Prior Art

A solid titanium halide is well known in the art as a catalyst component for use in the polymerization of olefins. However, in the polymerization with the solid titanium halide known as the conventional catalyst component, the yield of polymer per unit weight of the catalyst component or of titanium moiety in the catalyst component (hereinafter referred to simply as a polymerization activity per unit weight of the catalyst component or of titanium) is so low that the so-called deashing process for subsequently removing catalyst residues from the produced polymer is indispensable in order to obtain an industrially applicable polymer. In the deashing process, alcohols or chelating agents are used in large amounts, so that the deashing process needs an apparatus for recovery thereof as well as the deashing apparatus itself, and consequently has many problems accompanying therewith relative to resources, energy, and the like. Thus, the deashing process raises great problems to be solved urgently in the art. A number of studies and suggestions have been made for enhancing the polymerization activity per unit weight of titanium in the catalyst component, so that the complicated deashing process may be dispensed with.

Especially as a recent tendency, a large number of suggestions have been made such that the polymerization activity per unit weight of titanium in the catalyst component is remarkably enhanced in the polymerization of olefins with a catalyst component prepared by supporting a transition-metal compound as an active ingredient such as a titanium halide on a carrier material so that the active ingredient may act effectively.

Japanese Patent Laid-open Publication No. 126590/'75, for example, discloses a process for the preparation of a catalyst component, in which a magnesium halide as a carrier is brought into contact with an aromatic carboxylic acid ester by a mechanical means to form a solid reaction product, and the solid reaction product thus obtained is brought into contact with titanium tetrachloride in the liquid phase to obtain the catalyst component.

However, the prior art employing magnesium chloride as the carrier as described above, has such a disadvantage that the chlorine moiety contained in the magnesium chloride conventionally used as the carrier has an adverse effect on the produced polymer, resulting in leaving problems to be solved such as requirements for such a high activity as to be substantially free from the adverse effect due to the chlorine moiety, or as requirements for controlling a concentration of the magnesium chloride itself at a sufficiently low level.

Thus, many attempts have been made on the use of other substances effective as a carrier than magnesium chloride. No attempts as above, however, have succeeded in providing such a process as to be satisfactory for requirements in the art where both high polymerization activity per unit weight of the catalyst component and high yield of stereoregular polymer are needed.

As an example of the above attempts, Japanese Patent Laid-open Publication No. 120980/'74 discloses a process for the preparation of catalyst component for the polymerization of olefins, which comprises reacting magnesium acetate with an aluminium compound to form a reaction product followed by contacting the reaction product with a titanium tetrahalide to obtain a catalyst component, resulting in being unsuitable particularly for the polymerization of propylene, in which high yield of stereoregular polymer is required, and to which this invention is directed, as shown in a comparative example hereinafter illustrated.

SUMMARY OF THE INVENTION

An object of this invention is to provide an improved process for the preparation of catalyst component for the polymerization of olefins which is capable of greatly reducing both the amount of catalyst residues in the produced polymer and halogen content therein with high polymerization activity per unit weight of the catalyst component and with high yield of stereoregular polymer.

Another object of this invention is to provide a process for the preparation of catalyst component for the polymerization of olefins which is capable of readily producing the catalyst component on an industrial scale.

That is, the present invention provides a process for the preparation of catalyst component for the polymerization of olefins which comprises suspending (a) a fatty acid salt of magnesium and (b) dialkoxymagnesium into (c) a liquid halogenated hydrocarbon to form a first suspension, and adding said first suspension to (d) a titanium halide of the general formula: $TiX_4$, wherein X represents a halogen atom, to be contacted for reaction to form a first reaction mixture, (e) an electron donor compound being present in at least one of the first suspension, the titanium halide and the first reaction mixture; or suspending the dialkoxymagnesium into the liquid halogenated hydrocarbon to form a second suspension, and adding said second suspension to a mixture of the titanium halide and the fatty acid salt of magnesium to be contacted for reaction to form a second reaction mixture, the electron donor compound being present in at least one of the second suspension, the mixture of the titanium halide and the fatty acid salt of magnesium, and the second reaction mixture.

The use of the catalyst component prepared according to the process of the present invention makes it possible to provide therefrom a catalyst for the polymerization of olefins remarkably improved in its performance compared with that obtained from a catalyst component prepared according to a process in which either the fatty acid salt of magnesium or the dialkoxymagnesium is used singly, but not in combination. No industrially available catalyst component has been known in the art to be prepared from a starting material system including the fatty acid salt of magnesium and the dialkoxymagnesium in combination.

Polymerization of olefins by use of the catalyst component prepared according to the present invention results in such a trace amount of catalyst residues and an extremely low chlorine content in the produced polymer that the adverse effect of chlorine on the produced polymer can be neglected.

Since chlorine contained in the produced polymer causes corrosion of devices employed in such steps as pelletizing and molding, and further causes deterioration, yellowing, etc. of the produced polymer itself, reduction of chlorine content in the produced polymer as above has an extremely important meaning in the art.

It is of a common practice in the preparation of olefin polymer on an industrial scale that polymerization is carried out in the presence of hydrogen from the standpoints of controlling the melt index of polymer, etc., and the catalyst component prepared by use of magnesium chloride as a carrier in the prior art has such a disadvantage that both catalytic activity and stereoregularity of the polymer are greatly reduced. However, polymerization of olefins by use of the catalyst component prepared according to the present invention has such an effect that presence of hydrogen during polymerization causes little or no decrease in catalytic activity and in stereoregularity of the polymer providing extremely great advantages in the art.

DETAILED DESCRIPTION OF THE PREFERRED EMBODIMENTS

Examples of the fatty acid salt of magnesium used in the present invention include magnesium palmitate, magnesium stearate, magnesium behenate, magnesium acrylate, magnesium adipate, magnesium acetylene dicarboxylate, magnesium acetoacetate, magnesium azelate, magnesium citrate, magnesium glyoxylate, magnesium glutarate, magnesium crotonate, magnesium succinate, magnesium isovalerate, magnesium isobutyrate, magnesium octanoate, magnesium valerate, magnesium decanoate, magnesium nonanoate, magnesium dococenoate, magnesium undecenoate, magnesium elaidate, magnesium linoleate, magnesium hexanoate, magnesium heptoate, magnesium myristate, magnesium laurate, magnesium butyrate, magnesium oxalate, magnesium tartrate, magnesium suberate, magnesium sebacate, magnesium sorbate, magnesium tetrolate, magnesium hydroacrylate, magnesium pimelate, magnesium pyruvate, magnesium fumarate, magnesium propiolate, magnesium maleate, magnesium malonaldehydate, magnesium malonate, and the like, preferably including saturated fatty acid salt of magnesium, more preferably magnesium stearate, magnesium octanoate, magnesium decanoate, and magnesium laurate.

Examples of the dialkoxymagnesium used in the present invention include diethoxymagnesium, dibutoxymagnesium, diphenoxymagnesium, dipropoxymagnesium, di-sec-butoxymagnesium, di-tert-butoxymagnesium, diisopropoxymagnesium, and the like, preferably including diethoxymagnesium and dipropoxymagnesium.

The fatty acid salt of magnesium and dialkoxymagnesium are employed preferably in such a state that the moisture contained therein has been removed therefrom to be reduced to a minimum.

Examples of the liquid halogenated hydrocarbon used in the present invention include propyl chloride, butyl chloride, butyl bromide, propyl iodide, chlorobenzene, benzyl chloride, dichloroethane, trichloroethylene, dichloropropane, dichlorobenzene, trichloroethane, carbon tetrachloride, chloroform, methylene dichloride, and the like, preferably including propyl chloride, dichloroethane, chloroform, and methylene dichloride.

Examples of the electron donor compound used in the present invention include aliphatic carboxylic acid esters such as ethyl acetate and methyl methacrylate, aromatic carboxylic acid esters such as ethyl benzoate, ethyl toluate, and ethyl anisate, and the like, or mixtures thereof, preferably including aromatic carboxylic acid esters, more preferably ethyl benzoate, ethyl p-anisate, and ethyl p-toluate.

Examples of the titanium halide represented by the general formula $TiX_4$ wherein X is a halogen atom, include titanium tetrachloride, titanium tetrabromide, titanium tetraiodide, and the like, the titanium tetrachloride being preferred.

The amount to be used of the ingredients for the preparation of the catalyst component is not specifically limited unless it has adverse effects on the performance of the catalyst component formed therefrom, but the electron donor compound is used normally in an amount of from 0.01 to 10 g, preferably from 0.1 to 1 g, and the titanium halide is used normally in an amount more than 0.1 g, preferably more than 5 g per 1 g of the fatty acid salt of magnesium plus dialkoxymagnesium respectively.

The contacting order, contacting manner, etc. for the fatty acid salt of magnesium, dialkoxymagnesium, the electron donor compound and the titanium halide used in the present invention are not specifically limited. Preferably, in one aspect of the process of the present invention, the fatty acid salt of magnesium and dialkoxymagnesium are suspended in the liquid halogenated hydrocarbon to form the first suspension, and the first suspension is added to the titanium halide to be contacted for reaction to form the first reaction mixture, wherein the electron donor compound is present in at least one of the first suspension, the titanium halide and the first reaction mixture. Preferably, in another aspect of the process of the present invention, the dialkoxymagnesium is suspended in the liquid halogenated hydrocarbon to form the second suspension, and the second suspension is added to the mixture of the titanium halide and the fatty acid salt of magnesium to be contacted for reaction to form the second reaction mixture, wherein the electron donor compound is present in at least one of the second suspension, the mixture of the titanium halide and the fatty acid salt of magnesium, and the second reaction mixture.

More specifically, the first or the second suspension thus formed is kept in a suspended state at a temperature ranging from 0° C. to boiling point of the liquid halogenated hydrocarbon used for a period of time of normally less than 10 hours, preferably less than 3 hours, and is then added to the titanium halide or to the mixture of the titanium halide and the fatty acid salt of magnesium mainained at a temperature below 140° C., preferably below 100° C. followed by contacting for reaction at a temperature in the range of from normally room temperature to boiling point of the titanium halide used, preferably 70° C. to 100° C. Contacting time for reaction therein may be selected arbitrarily so long as existing ingredients are sufficiently reacted with each other, normally ranging from 10 minutes to 100 hours.

The first or the second reaction mixture may be brought into contact once or more times with the titanium halide, and also may be washed with an organic solvent such as n-heptane.

All the procedures described above in the process of the present invention should be preferably conducted in the absence of oxygen, water, etc.

The catalyst component thus obtained is combined with an organoaluminium compound to form a catalyst for the polymerization of olefins. The organoaluminium compound is used in a molar ratio of from 1 to 1000, preferably 1 to 300 per atom of titanium in the catalyst component. In the polymerization of olefins, a third ingredient such as an electron donor compound may be added.

The polymerization of olefins may be performed in the presence of, or in the absence of an organic solvent, and olefin monomers may be used in the gaseous or liquid state.

The polymerization temperature is below 200° C., preferably below 100° C., and the polymerization pressure is below 100 kg/cm² gauge, preferably below 50 kg/cm² gauge.

Examples of olefins homopolymerized or copolymerized by use of the catalyst component prepared by the process of the present invention include ethylene, propylene, 1-butene, 4-methyl-1-pentene, and the like.

The following Examples and Comparative Examples illustrate the present invention more in detail.

EXAMPLE 1

(Preparation of catalyst component)

To a 200 ml round flask fitted with a stirrer and thoroughly purged with nitrogen are charged 5 g of magnesium stearate, 5 g of diethoxymagnesium, 2.5 ml of ethyl benzoate, and 50 ml of methylene dichloride to form a suspension followed by stirring for 2 hours under reflux. The suspension is then injected into 200 ml of $TiCl_4$ at 0° C. in a 500 ml round flask fitted with a stirrer followed by heating up to 90° C. for reacting with agitation at that temperature for 2 hours. After the completion of the reaction, a reaction product is washed 10 times with 200 ml of dehydrated n-heptane at 40° C., and 200 ml of fresh titanium tetrachloride is added thereto for reacting with agitation at 90° C. for 2 hours. After the completion of the reaction, the reaction mixture is cooled down to room temperature. A washing procedure with 200 ml of dehydrated n-heptane is repeated until no chlorine is detected in the n-heptane after washing to complete the washing procedure and to obtain a catalyst component. The catalyst component thus obtained is subjected to solid-liquid separation procedure with the result that the titanium content in the solids thus separated is measured to be 3.83% by weight.

Polymerization of propylene

To a 2.0 liter autoclave fitted with a stirrer, the air in which is thoroughly replaced by nitrogen, 700 ml of n-heptane, 301 mg of triethyl aluminium, 137 mg of ethyl p-toluate and 0.5 mg as titanium atom of the catalyst component obtained as above are charged in an atmosphere of nitrogen. Thereafter 300 ml of hydrogen gas is charged thereinto and the resulting mixture is heated to 60° C. and subjected to propylene polymerization under a pressure of 6 kg/cm² gauge for 2 hours introducing thereinto propylene gas. After the completion of polymerization reaction, solid polymer thus obtained is collected by filtration and dried by heating at 80° C. under reduced pressure. On the other hand, the filtrate is thickened to obtain polymer soluble in a solvent used in polymerization.

The amount of the polymer soluble in the solvent used in polymerization is represented by (A), and the amount of the solid polymer obtained as above is represented by (B). The solid polymer is subjected to extraction with boiling n-heptane for 6 hours to obtain polymer insoluble in boiling n-heptane, the amount of which is represented by (C). The polymerization activity (D) per unit weight of the catalyst component is represented by the formula $$(D) = \frac{[(A) + (B)] (g)}{\text{amount of catalyst component (g)}}$$

and the yield (E) of crystalline polymer is represented by the formula $$(E) = (C)/(B) \times 100\%$$

Further, the overall yield (F) of crystalline polymer is represented by the formula $$(F) = \frac{(C)}{(A) + (B)} \times 100\%$$

The chlorine content and melt index of the produced polymer are represented by (G) and (H) respectively.

Results thus obtained are shown in Table-1.

EXAMPLE 2

The procedures of Example 1 are repeated except that 2.0 ml of ethyl benzoate is added to prepare a catalyst component. The titanium content in the solids separated is 3.95% by weight.

In the polymerization of propylene, the procedures of Example 1 are also repeated. Results thus obtained are shown in Table-1.

EXAMPLE 3

The procedures of Example 1 are repeated except that 3.0 ml of ethyl benzoate is used to prepare a catalyst component. The titanium content in the solids separated is 3.52% by weight.

In the polymerization of propylene, the procedures of Example 1 are also repeated. Results thus obtained are shown in Table-1.

EXAMPLE 4

The procedures of Example 1 are repeated except that said suspension is injected into $TiCl_4$ at room temperature to prepare a catalyst component. The titanium content in the solids separated is 4.11% by weight.

In the polymerization of propylene, the procedures of Example 1 are also repeated. Results thus obtained are shown in Table-1.

EXAMPLE 5

The procedures of Example 1 are repeated except that said fresh titanium tetrachloride is added for reaction at 80° C. to prepare a catalyst component. The titanium content in the solids separated is 3.80% by weight.

In the polymerization of propylene, the procedures of Example 1 are also repeated. Results thus obtained are shown in Table-1.

EXAMPLE 6

The procedures of Example 1 for the preparation of the catalyst component are repeated except that chloroform is used in place of methylene chloride. The titanium content in the solids separated is 3.84% by weight.

In the polymerization of propylene, the procedures of Example 1 are also repeated. Results thus obtained are shown in Table-1.

EXAMPLE 7

To a 100 ml round flask fitted with a stirrer and thoroughly purged with nitrogen are charged 5 g of diethoxymagnesium and 25 ml of methylene dichloride to form a suspension followed by stirring for 2 hours under reflux. Separately therefrom, to a 500 ml round flask fitted with a stirrer and thoroughly purged with nitrogen are charged 5 g of magnesium stearate, 2.5 ml of ethyl benzoate and 200 ml of $TiCl_4$ to be reacted with agitation at room temperature for one hour followed by cooling to 0° C. Thereafter, the former suspension is injected into the latter reaction mixture followed by heating to 90° C. for allowing to react with agitation at the elevated temperature for 2 hours. After the completion of the reaction, the resulting reaction mixture is washed 10 times with 200 ml of n-heptane, and 200 ml of fresh titanium tetrachloride is added thereto for allowing to react with agitation at 90° C. for 2 hours. After the completion of the reaction just above, the reaction mixture is cooled down to 40° C. A washing procedure with 200 ml of n-heptane is repeated until no chlorine is detected in the n-heptane after washing to complete the washing procedure and to obtain a catalyst component. The titanium content in the solids separated is 3.34% by weight.

In the polymerization of propylene, the procedures of Example 1 are also repeated. Results thus obtained are shown in Table-1.

COMPARATIVE EXAMPLE 1

(Preparation of catalyst component)

100 g of $MgCl_2$ and 31.5 g of ethyl benzoate are copulverized under an atmosphere of nitrogen for 18 hours. 100 g of the copulverized product is charged into a 2000 ml glass flask under an atmosphere of nitrogen, and 500 ml of $TiCl_4$ is added thereto to be reacted with agitation at 65° C. for 2 hours. After the completion of the reaction, the reaction mixture is cooled down to 40° C. and left at rest for removing the resulting supernatant liquid by decanting.

A washing procedure with 1000 ml of n-heptane is repeated until no chlorine is detected in the n-heptane after washing to complete the washing procedure and to obtain a catalyst component. The catalyst component thus obtained is subjected to solid-liquid separation procedure with the result that the titanium content in the solids thus separated is measured to be 1.28% by weight.

In the polymerization of propylene, the procedures of Example 1 are repeated except that 1.0 mg as titanium atom of the catalyst component is added thereto. Results thus obtained are shown in Table-1.

COMPARATIVE EXAMPLE 2

14.2 g of anhydrous magnesium acetate, 40.8 g of aluminium triisopropoxide and 50 ml of decalin are charged into a 200 ml round flask in an atmosphere of nitrogen, and are mixed with agitation for 10 hours at a temperature of from 170° to 230° C. After removing the solvent, the resulting reaction mixture is dried under reduced pressure to obtain a crude solid powder. The crude solid powder thus obtained is washed with 100 ml of anhydrous n-heptane 10 times. Thereafter the solvent is removed from a solid powder thus washed, and the resulting solid powder is dried under reduced pressure to obtain a final solid powder, to which 80 ml of titanium tetrachloride is then added to be mixed with agitation for 2 hours at 150° C. After the completion of the reaction, the reaction mixture is cooled down to room temperature. A washing procedure with 100 ml of dehydrated n-heptane is repeated until no chlorine is detected in the n-heptane after washing to complete the washing procedure and to obtain a catalyst component. The catalyst component thus obtained is subjected to solid-liquid separation procedure with the result that the titanium content in the solids thus separated is measured to be 12.2% by weight.

In the polymerization of propylene, the procedures of Example 1 are also repeated except that 1.62 mg as titanium of the catalyst component, 109 mg of triethyl aluminium and 35 mg of ethyl p-toluate are charged. Results thus obtained are shown in Table 1.

As apparent from the results shown in Table-1, the produced polymer is not obtained substantially in an amount enough to determine polymerization characteristics thereof.

COMPARATIVE EXAMPLE 3

(Preparation of catalyst component)

To a 200 ml round flask fitted with a stirrer and thoroughly purged with nitrogen are charged 10 g of magnesium stearate, 2.0 ml of ethyl benzoate, and 50 ml of methylene dichloride to form a suspension followed by stirring for 2 hours under reflux. The suspension is then injected into 200 ml of $TiCl_4$ at 0° C. in a 500 ml round flask fitted with a stirrer followed by heating up to 80° C. for reacting with agitation at that temperature for 2 hours. After the completion of the reaction, a reaction product is washed 10 times with 200 ml of dehydrated n-heptane at 40° C., and 200 ml of fresh titanium tetrachloride is added thereto for reacting with agitation at 80° C. for 2 hours. After the completion of the reaction, the reaction mixture is cooled down to 40° C. A washing procedure with 200 ml of dehydrated n-heptane is repeated until no chlorine is detected in the n-heptane after washing to complete the washing procedure and to obtain a catalyst component. The catalyst component thus obtained is subjected to solid-liquid separation procedure with the result that the titanium content in the solids thus separated is measured to be 3.13% by weight.

Polymerization of propylene

In the polymerization of propylene, the procedures of Example 1 are also repeated. Results thus obtained are shown in Table-1.

COMPARATIVE EXAMPLE 4

The procedures of Comparative Example 3 are repeated except that 5 g of diethoxymagnesium in place of magnesium stearate, and 25 ml of methylene dichloride are used to prepare a catalyst component. The titanium content in the solids separated is 3.80% by weight.

In the polymerization of propylene, the procedures of Example 1 are also repeated. Results thus obtained are shown in Table-1.

TABLE 1

| | Examples | | | | | | | Comparative Examples | | | |
|---|---|---|---|---|---|---|---|---|---|---|---|
| | 1 | 2 | 3 | 4 | 5 | 6 | 7 | 1 | 2 | 3 | 4 |
| Amount of polymer soluble in the solvent used in polymerization (A) g | 5.6 | 6.4 | 4.8 | 6.0 | 5.8 | 5.7 | 6.1 | 6.0 | — | 4.1 | 3.5 |
| Amount of solid polymer (B) g | 262 | 288 | 252 | 266 | 238 | 244 | 260 | 305 | 3 | 185 | 191 |
| Amount of polymer insoluble in boiling n-heptane (C) g | 253 | 277 | 244 | 256 | 230 | 236 | 251 | 287 | — | 177 | 183 |
| Polymerization activity per unit weight of catalyst component (D) | 20500 | 23200 | 18100 | 22300 | 18500 | 19200 | 17800 | 3930 | — | 11800 | 14800 |
| Yield of crystalline polymer (E) (%) | 96.5 | 96.3 | 97.0 | 96.4 | 96.6 | 96.8 | 96.5 | 94.1 | — | 95.7 | 95.8 |
| Overall yield of crystalline polymer (F) (%) | 94.5 | 94.2 | 94.2 | 94.3 | 94.3 | 94.6 | 94.6 | 92.8 | — | 93.6 | 94.1 |
| Chlorine content in the produced polymer (G) ppm | 27 | 24 | 30 | 25 | 30 | 29 | 31 | 168 | — | 47 | 38 |
| Melt index of the produced polymer (H) | 6.8 | 5.7 | 6.2 | 5.4 | 3.9 | 4.2 | 3.8 | 3.0 | — | 3.5 | 3.6 |

What is claimed is:

1. A process for the preparation of catalyst component for the polymerization of olefins which comprises suspending (a) a fatty acid salt of magnesium and (b) dialkoxymagnesium into (c) a liquid halogenated hydrocarbon to form a first suspension, and adding said first suspension to (d) a titanium halide of the general formula: $TiX_4$, wherein X represents a halogen atom, to be contacted for reaction to form a first reaction mixture, (e) an electron donor compound being present in at least one of the first suspension, the titanium halide and the first reaction mixture; or suspending the dialkoxymagnesium into the liquid halogenated hydrocarbon to form a second suspension, and adding said second suspension to a mixture of the titanium halide and the fatty acid salt of magnesium to be contacted for reaction to form a second reaction mixture, the electron donor compound being present in at least one of the second suspension, the mixture of the titanium halide and the fatty acid salt of magnesium, and the second reaction mixture.

2. A process according to claim 1, which further comprises contacting once or more times the first or the second reaction mixture with the titanium halide respectively.

3. A process according to claim 1, wherein the first or the second suspension is kept in a suspended state at a temperature ranging from 0° C. to boiling point of the liquid halogenated hydrocarbon used for less than 10 hours, and is then added to the titanium halide or to the mixture of the titanium halide and the fatty acid salt of magnesium maintained at a temperature below 140° C.

4. A process according to claim 3, wherein the first or the second suspension is kept in a suspended state for less than 3 hours, and is then added to the titanium halide or to the mixture of the titanium halide and the fatty acid salt of magnesium maintained at a temperature below 100° C. respectively.

5. A process according to claim 1, wherein contacting for reaction between the first suspension and the titanium halide, or between the second suspension and the mixture of the titanium halide and the fatty acid salt of magnesium is effected at a temperature in the range of from room temperature to boiling point of the titanium halide.

6. A process according to claim 5, wherein procedures of contacting for reaction are performed at a temperature of from 70° to 100° C. respectively.

7. A process according to claim 1, wherein the fatty acid salt of magnesium is saturated fatty acid salt of magnesium.

8. A process according to claim 7, wherein the fatty acid salt of magnesium is selected from magnesium stearate, magnesium octanoate, magnesium decanoate, and magnesium laurate.

9. A process according to claim 1, wherein dialkoxymagnesium is selected from the group consisting of diethoxymagnesium, dibutoxymagnesium, diphenoxymagnesium, dipropoxymagnesium, di-sec-butoxymagnesium, di-tert-butoxymagnesium, and diisopropoxymagnesium.

10. A process according to claim 9, wherein, dialkoxymagnesium is selected from diethoxymagnesium and dipropoxymagnesium.

11. A process according to claim 1, wherein the liquid halogenated hydrocarbon is selected from the group consisting of propyl chloride, butyl chloride, butyl bromide, propyl iodide, chlorobenzene, benzyl chloride, dichloroethane, trichloroethylene, dichloropropane, dichlorobenzene, trichloroethane, carbon tetrachloride chloroform, and methylene dichloride.

12. A process according to claim 11, wherein the liquid halogenated hydrocarbon is selected from propyl chloride, dichloroethane, chloroform, and methylene dichloride.

13. A process according to claim 1, wherein the titanium halide is titanium tetrachloride.

14. A process according to claim 1, wherein the electron donor compound is aromatic carboxylic acid esters.

15. A process according to claim 14, wherein the electron donor compound is selected from ethyl benzoate, ethyl p-anisate, and ethyl p-toluate.

* * * * *